United States Patent Office 3,564,601
Patented Feb. 16, 1971

3,564,601
OXIDATION OF TRIVALENT PHOSPHORUS ESTERS TO PENTAVALENT PHOSPHORUS ESTERS
Enrique R. Witt, Corpus Christi, Tex., Sam Carpenter, New City, N.Y., and Stone D. Cooley, Basking Ridge, N.J., assignors to Celanese Corporation, New York, N.Y., a corporation of Delaware
No Drawing. Continuation of application Ser. No. 43,731, July 19, 1960. This application June 10, 1964, Ser. No. 374,140
Int. Cl. C07f 9/02
U.S. Cl. 260—929      1 Claim

ABSTRACT OF THE DISCLOSURE

A phosphate ester of the following formula:

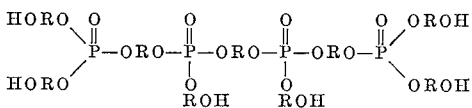

wherein R is the dipropylene ether radical, which may be used in polyurethane foam production.

---

This application is a continuation of our copending U.S. patent application Ser. No. 43,731, filed July 19, 1960, now abandoned.

This invention relates to phosphate esters.

It is an object of this invention to provide a novel, and general, method for the production of phosphate esters.

It is another object of this invention to provide new and useful organic phosphorus compounds.

Other objects of this invention will be apparent from the following detailed description and claims, in which all proportions are given by weight unless otherwise specified and the term "moles" refers to molecular weights in grams.

In accordance with one aspect of this invention pentavalent phosphorus esters are produced by treatment of the corresponding trivalent phosphorus esters with peracetic acid. We have found that by the use of peracetic acid, particularly peracetic acid in substantially anhydrous medium, it is possible to obtain an almost instantaneous exothermic reaction, with nearly quantitative consumption of peracetic acid and high yields of the desired esters with little or no undesired side-reactions. No catalyst is necessary.

Advantageously the peracetic acid is in solution in a solvent which is inert with respect to both the peracetic acid and the phosphite and phosphate esters under the conditions of this process. Such inert solvents include fatty acids such as glacial acetic acid, esters such as methyl acetate, acetals such as methylal and hydrocarbons such as cyclohexane.

The peracetic acid solution is added slowly to a phosphite ester while the latter is cooled efficiently and stirred. Some of the phosphite esters reacted are quite viscous and it has been found to be advantageous to also use an inert solvent for the phosphite ester of the type described with respect to the peracetic acid. Most preferably, the same solvent is used both for the phosphite ester and the peracetic acid. The rate of addition is preferably sufficiently slow to prevent any substantial rise in temperature caused by the reaction which is exothermic. The rate of reaction is so rapid that samples removed from the reaction mixture while the peracetic acid was being dropped into said mixture failed to give a positive test, for peracetic acid, with potassium iodide. However, as soon as a stoichiometric amount of the peracetic acid has been added (1 mole of peracetic acid per mole of phosphite ester) a positive test with potassium iodide is obtained. The basic reaction is

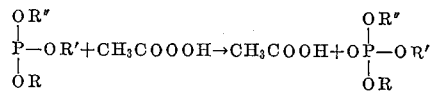

Where R, R' and R" are the same or different esterifying radicals, such as the radicals of alcohols or phenols.

Examples of pentavalent phosphorus esters which may be produced by the process of the present invention are trialkyl phosphates, such as tributyl, tricyclohexyl, triethyl, and tripropyl phosphate; trialkenyl phosphates such as tripropenyl and tributenyl phosphates; triaryl phosphates such as triphenyl, tricresyl, trixylenyl, and trinaphthylphosphates; triaralkyl phosphates such as trixylyl phosphate; trihaloalkyl phosphates such as tri(2-chloroethyl), tris(2-fluoroethyl), tris(dichloropropyl) or tris(chloropropyl) phosphates; tri-heterocyclic phosphates such as tris(tetrahydrofurfuryl) phosphate and mixed alkyl-aryl phosphates such as triphenoxyethyl phosphates. In each case the phosphate ester is made from the corresponding phosphite ester.

The process of this invention makes it possible to synthesize many novel compounds. One such group of compounds is the bridged-ring phosphates in which a carbon atom is joined to a phosphorus atom by three oxymethylene (—CH$_2$O—) groups thus

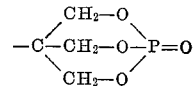

It will be seen that in these esters there are three six-membered rings: one ring involving the two —CH$_2$O— groups shown at the upper and middle part of the formula; a second ring involving the middle and lower —CH$_2$O— groups; and a third ring involving the upper and lower —CH$_2$O— groups. Compounds of this nature may be obtained by treating with peracetic acid the corresponding bridged-ring phosphite esters, which may in turn be obtained by a suitable transesterification reaction between a phosphite triester such as triphenyl phosphite and a compound having a 1,1-di(hydroxymethyl)-2 - hydroxyethyl group, that is, with a polyhydric alcohol having three methylol groups attached to a single carbon atom. Details of the production of the corresponding bridged-ring phosphites are given in copending application Ser. No. 794,496, filed Feb. 20, 1959 now abandoned, the entire disclosure of which is hereby incorporated by reference. Examples of phosphates which may be prepared in this manner are bridged-ring trimethylolpropane phosphate, bridged-ring trimethylolethane phosphate and bridged-ring pentaerythritol phosphate, of the formula

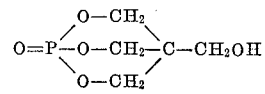

In the latter specific compounds the 1,1-di(hydroxymethyl)-2-hydroxyethyl group is attached to an ethyl, methyl, or hydroxymethyl radical, but this group may instead be attached to another radical or atom, such as another alkyl (e.g. butyl), hydrogen, an aryl radical (e.g. phenyl or benzyl), and amino group (e.g. to form the bridged-ring phosphate of aminotrimethylolmethane) or a nitro group (e.g. to form the bridged-ring phosphite of nitrotrimethylolmethane.) Compounds having a plurality of 1,1-di(hydroxymethyl)-2 - hydroxyethyl groups (e.g. dipentaerythritol) may be used to form phosphates containing a plurality of bridged-ring phosphate groups. The bridged-ring phosphates are useful pre-ignition inhibitors in leaded gasoline (e.g. in amounts to provide about 0.2 to 0.4 theory of phosphorus per theory of tetraethyl lead).

Another group of novel compounds which may be synthesized by the process of this invention are pentavalent phosphorus esters which contain epoxy groups. Compounds of this nature may be obtained by treating with peracetic acid, phosphite esters in which at least one of the esterifying radicals has olefinic unsaturation. The esters are oxidized from phosphites to phosphates together with the epoxidation of their olefinic bonds to produce epoxidized phosphates corresponding to the reacted phosphites. One mole of peracetic acid is added per mole of phosphite and at least one additional mole of peracetic acid is added for each olefinic bond contained in mole of phosphite ester if complete epoxidation is desired. However, it has been noted that rate of oxidation to phosphate ester far exceeds the rate of epoxidation. Accordingly, if only one mole of peracetic acid is used per mole of phosphite, there is substantially complete oxidation to the phosphate with substantially no epoxidation. The peracetic acid added in excess of the first mole is used in the epoxidation reaction. The reaction is preferably conducted at temperatures from about 0° C. to 100° C. The phosphites used may be conveniently produced by transesterification reaction between a phosphite triester such as triphenyl phosphite and a compound having a hydroxyl group and olefinic unsaturation i.e., an unsaturated alcohol such as allyl alcohol. The transesterification reaction is quite similar to the reaction hereinabove described for the product of bridged-ring phosphites conducted in the presence of a transesterification catalyst. In effect, an ester interchange takes place wherein the esterification radicals of the phospite triester are replaced (by esterification radicals having olefinic unsaturation) and form low boiling alcohols such as phenols which are removed by distillation.

Examples of phosphate esters containing epoxy groups which may be prepared in accordance with this invention are epoxidized alkenyl phosphates such as trioleylphosphate triepoxide, phenyldioleyl phosphate diepoxide, oleyldiphenylphosphate epoxide and tris(epoxystearyl) phosphate as well as compounds such as tris(epoxy monocrotylidene trimethylol propane) phosphate.

The novel epoxy group containing phosphate esters of this invention are useful as plasticizers which would increase the flame resistance of plasticized compounds. They are also useful as lubricant and fuel additives. They also may be used as plasticizers for compounds such as for polyvinyl chloride.

Another group of novel phosphate esters which may be produced in accordance with this invention are polymers, namely cross-linked polyphosphate esters containing phosphate groups, divalent radicals such as polymethylenes and polyalkylene ether radicals which have the formula —R(OR)$_n$ where R is an alkylene group and $n$ is a number at least one in value. These polymers also contain hydroxyl groups which act as chain terminators. These polymers may be conveniently shown structurally as follows:

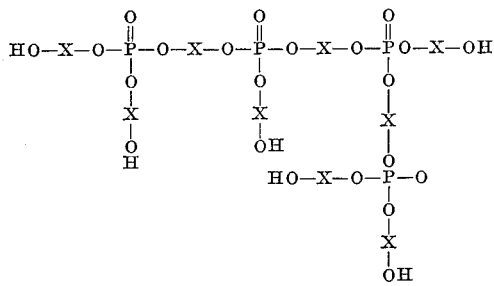

where X is the above described (R—OR)$_n$ or the polymethylene radical. The lengths of the chains are determined by the random attachment of OH groups which act as chain terminators. If desired, the terminal OH groups may be etherified with alcohols such as butanol or esterified by means of acidic compounds as acetic anhydride.

This novel cross-linked polyphosphate ester is obtained by treating with peracetic acid according to the process of this invention, the corresponding cross-linked polyphosphite ester which is also a novel compound.

The corresponding polyphosphite esters may be prepared by a transesterification reaction of a phosphite triester such as an aryl phosphite, e.g. a triphenyl, tricresyl, or trixylenyl phosphite with a glycol, that is either an alkandiol or a glycol ether. The preferred triester is triphenyl phosphite as the phenol produced has the lowest boiling point and is therefore most easily removed by distillation. The transesterification process is quite similar to the previously described transesterification processes. It is preferably conducted in the presence of a transesterification catalyst such as metallic sodium, said catalyst preferably being present in quantities of less than 1% of the reaction mixture. The desirable pressures and temperatures which will, of course, depend on the boiling points of the alcohol and phosphite produced, may be, for example in the range of about 0 to 760 mm. Hg absolute and about room temperature to 300° C. respectively. As the pressures are subatmospheric, the distillation procedures involved may be referred to as vacuum distillations. The proportions of the reactants are preferably in the range of from 1.5 to 3 moles of glycol per mole of phosphite triester. Using these proportions, the polymer formed will be in the liquid state.

The novel polyphosphite esters produced correspond structurally to the above described cross-linked polyphosphate esters except that they have phosphite groups instead of phosphate groups.

The glycols which may be reacted in the formation of the polyphosphite ester include aliphatic glycols such as pentamethylene glycol, diethylene glycol, dipropylene and other polypropylene glycols, aromatic diols such as dihydroxymethyl benzene and aromatic glycol ethers such as dioxyethylol benzene.

For best results, glycols in which the hydroxyl groups are attached to carbons separated by at least 2 carbon atoms such as in 1,4 and 1,5 glycols are preferred. In compounds in which the hydroxyl groups are closer together as 1,2 and 1,3 glycols polymerization is less extensive and is accompanied by undesirable cyclization.

Examples of the novel cross-linked polyphosphate and their corresponding novel polyphosphites which may be prepared in accordance with this invention are polyphosphite and polyphosphate esters containing divalent monomers including polymethylenes such as pentamethylene, tetramethylene, and hexamethylene; polyalkylene ether radicals such as dipropylene and other polypropylene glycols, and diethylene glycol.

Both the novel polyphosphites and polyphosphates are useful in polyurethane foam production. They react with diisocyanates to give polyurethanes incorporating phosphorus which confers a degree of flameproofing to the polyurethane.

The phosphate esters of this invention also include novel phosphate esters containing at least one acetal ring. The acetal ring comprises a carbon atom linked to 2 oxygen atoms each of which is in turn linked to the opposite terminal atoms of a chain of at least 2 carbon atoms. One of the carbon atoms in the chain is linked to the phosphorus atom of the phosphate group through a linkage including one of oxygen atoms of said phosphate group. This phosphate ester may be shown structurally as follows:

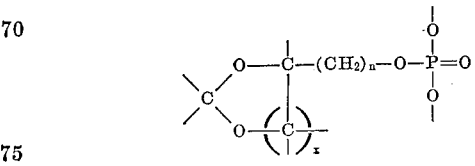

where $n$ is a number of 0 or greater value and $x$ is a number, at least 1 in value.

This novel acetal ring containing phosphate ester is obtained by treating with peracetic acid according to the process of this invention, the corresponding acetal ring containing phosphite ester which is also a novel compound.

The novel corresponding acetal ring containing phosrated or unsaturated, e.g., crotonaldehyde, acetone, formtion of a phosphite triester such as an aryl phosphite with an acetal ring containing alcohol produced by the reaction between an alcohol having at least 3 hydroxyl groups and a compound containing a carbonyl group such as an aldehyde or a ketone. The acetal ring containing alcohol may be shown, for example, as having the following structural formula.

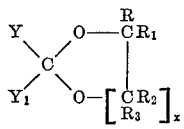

where R, $R_1$, $R_2$ and $R_3$ are members selected from the group consisting of hydrogen, alkyl, hydroxyl and hydroxyalkyl radicals, there being present on the ring at least one hydroxyl or one hydroxyalkyl radical, $x$ is a number at least 1 in value and Y and $Y_1$ are members selected from the group consisting of hydrogen, hydrocarbons and substituted hydrocarbon radicals. Among the alcohols containing at least 3 hydroxyl groups which may be used in the preparation of the acetal ring containing alcohol are trimethylolpropane, trimethylolethane, pentaerythritol, erythritol, glycerol and inositol. The carbonyl group containing compound may be an aldehyde or ketone, saturated or unsaturated, e.g., crotonaldehyde, acetone, formaldehyde. Where monocrotylidene trimethylolpropane or monocrotylidene trimethylolethane are the acetal ring containing alcohols used, these alcohols may be prepared by reacting trimethylolethane or propane in the presence of an acid catalyst at elevated temperature, preferably at the reflux temperature of the reaction mixture. This procedure is set forth in copending application No. 822,210, filed June 23, 1959 now Patent No. 3,054,803.

The preferred triester is triphenyl phosphite because of its low boiling point and the ease with which it may be removed by distillation. Except for the reactants, the transesterification process is essentially the same as that previously described. It is conducted in the presence of a transesterification catalyst, preferably present in quantities of less than 1% of the reaction mixture under pressures of 0 to 760 mm. Hg and temperatures in the range of 0 to 300° C. The proportions of the reactants are preferably in the range of from 1 to 3 moles of acetal ring containing alcohol for each mole of phosphite triester. The extent of the ester interchange and consequently the nature of the acetal ring containing phosphite will vary with the amount of acetal ring containing alcohol reacted. For example, if one mole of the alcohol is reacted with one mole of the triphenyl phosphite, only one phenyl group in each molecule will be replaced by ester interchange. Thus, the product will be a diphenyl phosphite containing 1 acetal ring group. On the other hand, if 3 moles of the alcohol are reacted with 1 mole of triphenyl phosphite, all 3 phenyl groups in each molecule will be replaced to give a phosphite containing 3 acetal rings.

The novel acetal ring containing phosphite esters produced correspond structurally to the above-described cyclic acetal containing phosphate esters except that they have phosphite groups instead of phosphate groups.

Examples of the novel acetal ring containing phosphite and phosphate esters which may be prepared in accordance with this invention are diphenyl-monocrotylidene trimethylolpropane phosphite and phosphate, tris (monocrotylidene trimethylolpropane) phosphite and phosphate phenyl, monocrotylidene pentaerythritol phosphite and phosphate, tris (trimethylolpropane formal) phosphite and phosphate and tris (trimethylolpropane acetal) phosphite and phosphate.

The acetal ring containing phosphites and phosphates are useful as plasticizers or functional fluids. They are useful intermediates, e.g., when these phosphites contain ethylenic unsaturation, as in a side chain, they may be epoxidized to provide epoxy resins useful as plasticizers.

The following examples are given to illustrate this invention further.

EXAMPLE I

To 1 mole (gram-mole) of tributyl phosphite and 100 ml. of glacial acetic acid in a vessel maintained at 0° C. by means of a cold bath, one mole of peracetic acid as a 4 M solution in acetic acid is added dropwise with continuous stirring. The reaction is a rapid exothermic one and, accordingly, the rate of addition should be sufficiently slow to prevent the temperature of the reaction mixture from rising. During the addition of the peracetic acid, samples of the reaction mixture are periodically removed and tested for peracetic acid by potassium iodide. These samples fail to give a positive test for peracetic acid indicating an almost immediate consumption of the added peracetic acid. However, after the addition of one mole of peracetic acid is completed, the test is positive.

The reaction product is then stripped of acetic acid and the tributyl phosphate is recovered by conventional distillation procedures. The yield of tributyl phosphate is 94% of theoretical.

EXAMPLE II

To 1 mole of triphenyl phosphite and 100 ml. of glacial acetic acid in a vessel maintained at 0° C. by means of a cold bath, one mole of peracetic acid as a 4 M solution in acetic acid is added dropwise with continuous stirring. The reaction product is then stripped of acetic acid and the triphenyl phosphate is recovered by conventional distillation procedures.

EXAMPLE III

To 1 mole of tris(chloroethyl) phosphite and 100 ml. of glacial acetic acid in a vessel maintained at 0° C. by means of a cold bath, one mole of peracetic acid as a 4 M solution in acetic acid is added dropwise with continuous stirring. The reaction product is washed with water and the oil layer is then washed with a sodium carbonate solution and dried. The product is tris(chloroethyl) phosphate.

EXAMPLE IV

To 1 mole of tris(tetrahydrofurfuryl) phosphite and 100 ml. of glacial acetic acid in a vessel maintained at 0° C. by means of a cold bath, one mole of peracetic acid as a 4 M solution in acetic acid is added dropwise with continuous stirring. The reaction product is then stripped of acetic acid. The remaining liquid contains tris(tetrahydrofurfuryl) phosphate product.

EXAMPLE V

To 1 mole of tricresyl phosphite and about 100 g. of cresylic acid in a vessel maintained at 0° C. by means of a cold bath, one mole of peracetic acid as a 4 M solution in acetic acid is added dropwise with continuous stirring. The reaction product is then stripped of acetic acid, cresylic acid and any cresol which may form by conventional procedures. The product contains tricresyl phosphate.

EXAMPLE VI

To 0.05 mole of trioleylphosphite in a vessel immersed in a Dry Ice-acetone bath, 0.07 mole of peracetic acid as a 10% solution in methyl acetate solvent are slowly added. When the reaction mixture warms to room temperature, an additional 0.21 mole of peracetic acid in solution are added in one portion. After 4 hours at room temperature, the mixture is added to about 200 ml. of water. An emulsion forms which is extracted with benzene. The benzene layer is then washed with a 5% sodium carbonate solution until basic to litmus and then with water until neutral. The benzene is distilled off leaving the product, triolylphosphate triepoxide. Analysis indicates that 64% of the double bonds have been oxidized to epoxides. The product is then treated with an additional 0.08 mole of peracetic acid in the 10% methyl acetate solutions, 84.5% of the double bonds of the resulting product have been oxidized to epoxides.

EXAMPLE VII

Bridged-ring trimethylolpropane phosphite is prepared in accordance with the procedure set forth in copending application Ser. No. 794,496 by charging 536 parts (4 moles) of 1,1,1-trimethylolpropane, 1240 parts (4 moles) of triphenyl phosphite and 1 part of metallic sodium into a reactor fitted with a 20-tray distillation column. The mixture is maintained under a subatmospheric pressure of 44 mm. Hg a. and heated. 80% of the distillate from the column is returned to the top of the column as reflux. The heating under the subatmospheric pressure is continued while distillation occurs. There is obtained 1065.7 parts of a first distillation cut, consisting of phenol, followed by 35.9 parts of an intermediate cut containing 11.9 parts of a phenol and 24.0 parts of bridged-ring trimethylolpropane phosphite. The last cut, 585 parts, is bridged-ring trimethylolpropane phosphite.

To 1 mole of bridged-ring trimethylolpropane phosphite dissolved in 200 ml. of xylene in a vessel maintained at 0° C. by means of a cold bath, one mole of peracetic acid as a 10% solution in methyl acetate solvent is added dropwise with continuous stirring. A crystalline powder precipitates which is separated by filtration. The crystals are washed with pentane and then, the solvent is removed under vacuum. The yield of bridged-ring trimethylolpropane phosphate is 91% of theoretical. The melting point of the product is 200–205° C.

EXAMPLE VIII

Following the procedure given in Example VII, bridged-ring trimethylolethane phosphite is synthesized from trimethylolethane and triphenyl phosphite. To one mole of bridged-ring trimethylolethane phosphite dissolved in 200 ml. of benzene in a vessel maintained at 0° C. by means of a cold bath, one mole of peracetic acid as a 10% solution in methyl acetate solvent is added dropwise with continuous stirring. A crystalline powder precipitates which is separated by filtration. The crystals are washed with pentane and then, the solvent is removed under vacuum. The product is bridged-ring trimethylolethane phosphate having a melting point of 248.6–250.4° C.

EXAMPLE IX

Following the procedure given in Example VII, bridged-ring pentaerythritol phosphite is synthesized from pentaerythritol and triphenyl phosphite. To one mole of bridged-ring pentaerythritol phosphite dissolved in a solvent consisting of 200 ml. of benzene, 100 ml. of methyl acetate and 100 ml. of methanol in a vessel maintained at 0° C. by means of a cold bath, one mole of peracetic acid as a 10% solution in methyl acetate solvent is added dropwise with continuous stirring. A crystalline powder precipitates which is separated by filtration. The crystals are washed with pentane and then, the solvent is removed under vacuum. The product is bridged-ring pentaerythritol phosphate having a melting point of 207.4–214.0° C.

EXAMPLE X

First monocrotylidene trimethylolpropane was prepared as follows according to the procedure of copending application Ser. No. 822,210, now U.S. Pat. No. 3,054,803. 268 parts of trimethylolpropane (2 moles), 420 parts of crotonaldehyde (6 moles) and 3 parts of 85% phosphoric acid (0.03 mole) were stirred vigorously and heated at the boiling point, for 3 hours, in a vessel equipped with a decanter head and reflux condenser. During this three-hour period 36 parts (2 moles) of water were removed while condensed water-immiscible material was continuously returned to the reaction mixture. The reaction mixture was then cooled and washed with 110 parts of a water solution containing 10 parts of sodium bicarbonate to neutralize the catalyst. The washed material was again washed with 200 parts of water to effect further removal of salts.

The washed mixture was distilled at atmospheric pressure to remove unreacted crotonaldehyde as its water azeotrope overhead and the residue was then vacuum flashed at 2 mm. Hg a., with heating, until the base temperature reached 205° C. and the top temperature (vapor temperature) reached 170° C. The resulting flash distillate was then fractionated at 50 mm. Hg a. to produce a colorless oily fraction boiling at 182–184° C.

Tris (monocrotylidene trimethylolpropane) phosphite having the formula

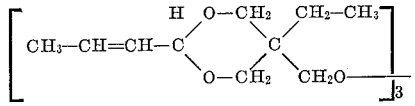

is then prepared by adding 1150 g. (6 moles) of the monocrotylidene trimethylolpropane, 698 g. (2.26 moles) of triphenyl phosphite and 3 g. of metallic sodium to a reactor attached to a vacuum still. The phenol formed is then removed by vacuum stripping at subatmospheric pressure of 2 mm. Hg a. and a temperature of 200° C. The residue is a 98.3% of theoretical yield of tris(monocrotylidene trimethylolpropane) phosphite. The product has a specific gravity at 25°/4° C. of 1.0929, a refractive index at 25° C. of 1.4920 and a viscosity of 5700 cp. at 25° C.

EXAMPLE XI

Tris(monocrotylidene trimethylolpropane) phosphate having the formula

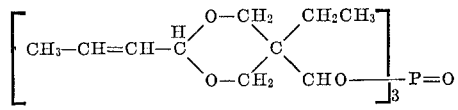

is prepared by dissolving 1.94 moles of tris(monocrotylidene tri-methylolpropane) phosphite in 500 ml. of benzene in a vessel maintained at 0° C. by a cold bath. 1.94 moles of peracetic acid as a 10% solution in methyl acetate solvent is then added dropwise with continuous stirring. The reaction product is then stripped free of methyl acetate, benzene and acetic acid, washed with sodium carbonate and dehydrated. The product has a specific gravity at 25°/4° C. of 1.120, a refractive index at 25° C. of 1.4870 and a viscosity of 61,000 cp. at 25° C.

EXAMPLE XII 1240 g. (4 moles) of triphenyl phosphite, 1206 g. (9 moles) of dipropylene glycol and 2 g. of metallic sodium are reacted in a reactor attached to a vacuum still. The phenol formed is removed by vacuum stripping at a subatmospheric pressure of 2 mm. Hg a. and temperature of 170° C. The residue is a clear viscous pale yellow liquid substantially containing polyphosphite ester. The product is washed with a sodium carbonate-sodium bicarbonate solution and then stripped of water. The product is then diluted with toluene. The polyphosphite ester yield is 99.2% of theoretical. The ester is clear transparent liquid having a specific gravity at 25°/4° C. of 1.1203, a viscosity of 2476 cp. at 25° C. and a refractive index of 1.4748 at 25° C.

EXAMPLE XIII

The 2 moles of the polyphosphite ester prepared in Example XII in an equal amount by weight of benzene in a vessel maintained at 0° C. by a cold bath, 2 moles of peracetic acid as a 10% solution in methyl acetate solvent is added dropwise with continuous stirring. The product is then washed in a potassium carbonate solution, solvent stripped and dried. The product is a polyphosphate ester having a specific gravity of 1.22 at 24°/4° C., a viscosity of 7665 cp. at 25° C. and a refractive index of 1.4615 at 25° C.

EXAMPLE XIV

Example IV is repeated using the same conditions, ingredients and proportions except that 1 mole of tris phenoxyethyl) phosphite is used instead of the tris (tetrahydrofurfuryl) phosphite. The remaining liquid contains the tris(phenoxyethyl) phosphate product.

EXAMPLE XV

To 600 g. of dioleyl phenyl phosphite in a vessel immersed in an ice bath, 575 ml. of 1.58 molar peracetic acid in propylene oxide solvent is slowly added while maintaining the mixture at below 10° C. An exothermic reaction occurs. After this reaction ceases an additional 2.2 liters of the peracetic acid are added in one portion. The mixture is allowed to remain at room temperature overnight, after which it is heated to and maintained at 45° C. for 4 hours. The mixture is then distilled at room temperature to remove about half of the propylene oxide. The product is then washed in 3 liters of water and the organic layer separated and then washed with sodium carbonate solution until basic to litmus and then with water until neutral. After which the remaining solvent is stripped from the product at 3 mm. Hg A. and a pot temperature of 100° C. Analysis indicates that 73.3% of the double bonds have been oxidized to epoxides.

EXAMPLE XVI

To 433 g. of diphenyl oleyl phosphite in a vessel immersed in an ice bath, 400 ml. of 2.17 molar peracetic acid solution in methyl acetate is added dropwise while maintaining the reaction temperature below 10° C. After the initial exothermic reaction has ceased, an additional 600 ml. of the peracetic solution is added in one portion. The mixture is maintained at room temperature for 4 hours and then maintained at a temperature below 10° C. overnight. The methyl acetate solvent is vacuum stripped under a pressure of 10 mm. Hg. A. and a pot temperature of 20° C. The product is then washed with water and the resulting emulsion is extracted with benzene. The benzene layer is washed with an aqueous potassium carbonate solution until basic and then with water until neutral. The benzene is then removed by vacuum distillation leaving a product in which 83.4% of the doubled bonds have been epoxidized.

EXAMPLE XVII

The procedure of Example XVI is repeated using tris (stearyl) phosphite and peracetic acid, a total of 4 moles of peracetic acid being added for each mole of the phosphite. The product is tris (epoxystearyl) phosphate.

Having described our invention what we desire to secure by Letters Patent is:

1. A phosphate ester of the following formula:

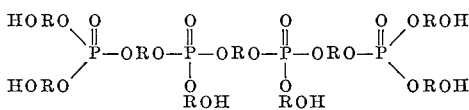

wherein R is the dipropylene ether radical.

References Cited

UNITED STATES PATENTS

| | | | |
|---|---|---|---|
| 2,411,671 | 11/1946 | Smith et al. | 260—928X |
| 2,909,559 | 10/1959 | Lanham | 260—928 |
| 2,851,476 | 9/1958 | Hechenbleikner | 260—985 |
| 3,061,625 | 10/1962 | Friedman | 260—985 |

ALEX MAZEL, Primary Examiner

J. H. TURNIPSEED, Assistant Examiner

U.S. Cl. X.R.

44—76; 208—16; 260—30.6, 92.8, 96.5, 340.7, 340.9, 347.8, 348, 348.5, 927, 928, 930, 936, 937, 955, 956, 958, 963, 966, 967, 982, 985

PO-1050
(5/69)

UNITED STATES PATENT OFFICE
CERTIFICATE OF CORRECTION

Patent No. 3,564,601          Dated February 16, 1971

Inventor(s) Enrique R. Witt et al

It is certified that error appears in the above-identified paten and that said Letters Patent are hereby corrected as shown below:

Please correct the following errors:

On page 1, column 2, line 16, replace "tri(2-chloroethy with --tris(2-chloroethyl)--.

On page 3, column 5, lines 8 and 9, after the word "containing", please delete "phosrated or unsaturated, crotonaldehyde, acetone, formation of a" and add the following --phosphite esters may be obtained by a trans esterification reaction of a--.

Signed and sealed this 14th day of March 1972.

(SEAL)
Attest:

EDWARD M. FLETCHER, JR.          ROBERT GOTTSCHALK
Attesting Officer                Commissioner of Patents